April 21, 1970 A. TURECKI 3,508,033
COUNTER CIRCUITS
Filed Jan. 17, 1967 3 Sheets-Sheet 1
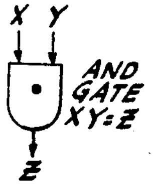
Fig. 1a.
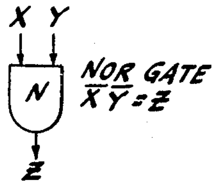
Fig. 1b.
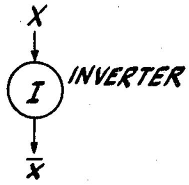
Fig. 1c.
| X | Y | • | N |
|---|---|---|---|
| 0 | 0 | 0 | 1 |
| 0 | 1 | 0 | 0 |
| 1 | 0 | 0 | 0 |
| 1 | 1 | 1 | 0 |
Fig. 1d.
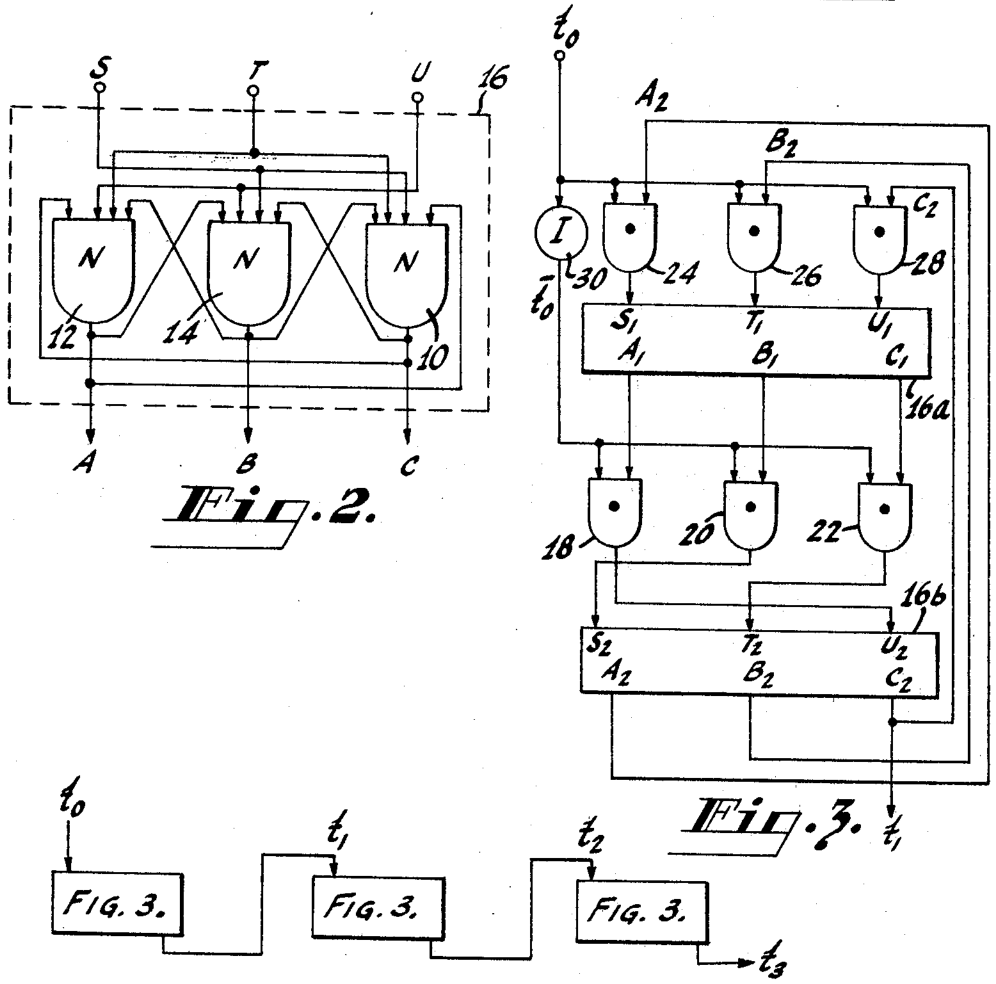
Fig. 2. Fig. 3. Fig. 4.
Inventor:
ANATOLE TURECKI
By [signature]
Attorney April 21, 1970 A. TURECKI 3,508,033

COUNTER CIRCUITS

Filed Jan. 17, 1967 3 Sheets-Sheet 2

Inventor:
ANATOLE TURECKI
By [signature]
Attorney

April 21, 1970 A. TURECKI 3,508,033

COUNTER CIRCUITS

Filed Jan. 17, 1967 3 Sheets-Sheet 3

Inventor:
ANATOLE TURECKI
By Samuel Cole
Attorney

United States Patent Office 3,508,033

Patented Apr. 21, 1970

3,508,033

COUNTER CIRCUITS

Anatole Turecki, North Palm Beach, Fla., assignor to RCA Corporation, a corporation of Delaware Filed Jan. 17, 1967, Ser. No. 609,865

Int. Cl. H03k 29/00, 21/06

U.S. Cl. 235—92 4 Claims

ABSTRACT OF THE DISCLOSURE

A counter stage comprising two $n$-state circuits, where $n \geqq 3$, and gates connecting the first circuit to the second and the second back to the first. During one-half cycle of a timing signal, one circuit receives an input through its gates which causes it to change state and the other circuit receives an input through its gates which causes it to retain its storage state and during the other half cycle of the timing signal, the reverse occurs. An $n$-base counter may be constructed by interconnecting a plurality of such stages, each stage after the first employing as its timing signal an output signal of the preceding stage.

SUMMARY OF THE INVENTION

A stage in a counter according to the invention includes two $n$-state circuits (where $n$ is at least equal to 3), gates interconnecting the output terminals of each circuit to the input terminals of the other such circuit and means for priming the gates between circuits in sequence. Each time a set of gates is primed, it changes the state of one of the $n$-state circuits which it drives. The interconnections are such that each circuit cycles through its $n$ states in sequence.

BRIEF DESCRIPTION OF THE DRAWING

FIGURES 1*a*–1*d* are diagrams of the conventions employed in the remaining figures;

FIGURE 2 is a block circuit diagram of a three-state memory circuit employed in the counter of FIGURE 3;

FIGURE 3 is a block circuit diagram of one stage of a ternary counter according to the invention;

FIGURE 4 is a block circuit diagram of three stages of a t ernary counter according to the invention;

DETAILED DESCRIPTION

Figure 5:
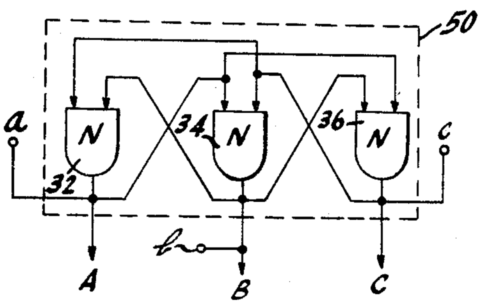
FIGURE 5 is a block circuit diagram of another form of three-state circuit, this one employed in the ternary counter of FIGURE 6.

The blocks making up the figures are circuits which receive electrical signals indicative of binary digits (bits) and which produce output signals indicative of bits. For the sake of brevity in the explanation which follows, rather than speaking of the signal which represents the binary digit 1 or 0 the bit itself is referred to.

FIGURES 1*a*, 1*b* and 1*c* show elementary logic elements, an AND and a NOR gate and an inverter, respectively, employed in the circuits which follow. The Boolean equations in FIGURES 1*a* and 1*b* define the operation of the gates as does the truth table of FIGURE 1*d*.

The three-state circuit of FIGURE 2 comprises three NOR gates 10, 12 and 14 interconnected as shown. Note that the output of each gate is applied to the remaining two gates. Note also that the input signal S is applied to gates 10 and 14; the input signal T is applied to gates 10 and 12; and the input signal U is applied to gates 12 and 14.

The operation of the circuit of FIGURE 2 is completety described in Table I below. The letters $A_0$, $B_0$ and $C_0$ represent the assumed present state of the circuit, that is, the values of A, B and C, respectively, at the circuit output terminals, at the very instant new values of S, T and U are applied to the circuit. The three digit binary numbers within the body of the map represent $A_1B_1C_1$, the next circuit state, that is, the values A, B and C will assume in response to the inputs S, T and U, respectively.

TABLE I

| STU / $A_0B_0C_0$ | 000 | 001 | 010 | 100 | |
|---|---|---|---|---|---|
| 001 | 001 | 001 | 010 | 100 | $A_1B_1C_1$ |
| 010 | 010 | 001 | 010 | 100 | |
| 100 | 100 | 001 | 010 | 100 | |

The map above may be constructed by considering the Boolean equations which define the operation of the circuit of FIGURE 2. They are:

$$A_1=\overline{S}\cdot\overline{T}\cdot\overline{U}\cdot A_0+S\cdot\overline{T}\cdot\overline{U}=\overline{T}\cdot\overline{U}\cdot(A_0+S) \quad (1)$$

$$B_1=\overline{S}\cdot\overline{U}\cdot(B_0+T) \quad (2)$$

$$C_1=\overline{S}\cdot\overline{T}(C_0+U) \quad (3)$$

where the subscript 0 identifies the present value of a bit and the subscript 1 identifies the next value of the bit, that is, the value when a new set of input conditions exists. The first part of an equation such as (1) states that in the absence of the setting signals STU, $A_1=A_0$, that is, the circuit preserves its previous state, thus exhibiting its fundamental property as a memory element. The equation also states that after the setting pulse S is applied, that is, only after S becomes 1, does $A_1$ become 1, no matter what the previous circuit state was.

It can be shown that the circuit of FIGURE 2 can assume only one of four possible conditions, that is, one of $ABC=000$, $ABC=001$, $ABC=010$ and $ABC=100$. Of these, the last three are stable memory states in that when the input changes to 000, the circuit can retain any one of 001. 010 or 100.

One stage of a ternary counter according to the invention is shown in FIGURE 3. The counter includes two three-state circuits 16*a* and 16*b*, each identical to the circuit 16 shown within the dashed block of FIGURE 2. The output of circuit 16*a* is applied through AND gates 18, 20 and 22 to the input terminals of three-state circuit 16*b*; the output of three-state circuit 16*b* is applied through gates 24, 26 and 28 to three-state circuit 16*a*. These six gates are all AND gates. In addition to these inputs, the six AND gates also receive trigger pulses $t_0$. They are applied directly to AND gates 24, 26 and 28 and through an inverter 30 to AND gates 18, 20 and 22.

The operation of the circuit of FIGURE 3 is depicted in the following table.

TABLE II

| $t_0$ | $A_2$ | $B_2$ | $C_2$ | $S_1$ | $T_1$ | $U_1$ | $A_1$ | $B_1$ | $C_1$ | $S_2$ | $T_2$ | $U_2$ |
|---|---|---|---|---|---|---|---|---|---|---|---|---|
| Start | 1 | 0 | 0 | | | | | | | | | |
| 1 | 1 | 0 | 0 | 1 | 0 | 0 | 1 | 0 | 0 | 0 | 0 | 0 |
| 0 | 0 | 0 | 1 | 0 | 0 | 0 | 1 | 0 | 0 | 0 | 0 | 1 |
| 1 | 0 | 0 | 1 | 0 | 0 | 1 | 0 | 0 | 1 | 0 | 0 | 0 |
| 0 | 0 | 1 | 0 | 0 | 0 | 0 | 0 | 0 | 1 | 0 | 1 | 0 |
| 1 | 0 | 1 | 0 | 0 | 1 | 0 | 0 | 1 | 0 | 0 | 0 | 0 |
| 0 | 1 | 0 | 0 | 0 | 0 | 0 | 0 | 1 | 0 | 1 | 0 | 0 |

The discussion which follows of the way in which the values in the table are determined is to help the reader follow the circuit operation. Assume that $A_2B_2C_2$ initially is 100 and that $t_0=1$. As $A_2$ and $t_0$ are both 1, AND gate 24 is enabled whereas since $B_2$ and $C_2$ are both 0 AND gates 26 and 28 are disabled. The input to three-state circuit 16*a* is therefore $S_1T_1U_1=100$. Table I indicates that there is only one circuit state which is possible for this input, namely $A_1B_1C_1=100$. AND gates 18, 20 and 22 are all disabled by the input $\bar{t}_0=0$, and therefore $S_2T_2U_2=000$. Table I shows that for input $STU=000$, the circuit (16*b*) may assume any one of three stable conditions. However, as the circuit output already is 100, the circuit remains in this state. From this analysis it is clear that the first complete line of Table II is correct.

In the operation depicted in the second line of the table, the trigger pulse $t_0$ has changed to 0. This primes gates 18, 20 and 22. Of the inputs to these three AND gates only $A_1=1$ so that gate 18 becomes enabled and gates 20 and 22 remain disabled. The input to three-state circuit 16*b* therefore is $S_2T_2U_2=001$. Table I indicates that the only stable output which is possible for this input is $A_2B_2C_2=001$. Thus, the second complete line in Table II is correct and represents a stable condition for the counter.

In a manner similar to the above, the remainder of the circuit operation readily can be traced. It will be seen that in response to three complete cycles of the trigger pulse $t_0$ the output of stage 16*b* cycles through its three states 100, 001, 010 in that order. By changing the gate connections, the order of the count can be changed to 100, 010, 001 and so on.

If desired, the $C_2$ output of stage 16*b* of the counter of FIGURE 3 may be employed as a triggering pulse for the following stage of a multiple stage counter. For purposes of illustration such a counter, which includes three-stages, is shown in FIGURE 4. Each block in the figure comprises the circuit of FIGURE 3. Note that $t_1$ changes to 1 at one-third the rate of $t_0$; $t_2$ changes to 1 at one-ninth the rate of $t_0$; $t_3$ changes to 1 at one-twenty-seventh the rate of $t_0$; and so on.

Another three-state circuit which may be employed in a ternary counter according to the invention is shown in FIGURE 5. This circuit includes three NOR gates 32, 34 and 36 which are cross-coupled in the manner shown. Each NOR gate, in other words, receives as its two inputs the outputs of the remaining two NOR gates. The operation of the circuit of FIGURE 5 is depicted in Table III below.

TABLE III

| abc / $A_0B_0C_0$ | 001 | 010 | 100 | 000 | |
|---|---|---|---|---|---|
| 001 | 001 | 010 | 100 | 001 | $A_1B_1C_1$ |
| 010 | 001 | 010 | 100 | 010 | |
| 100 | 001 | 010 | 100 | 100 | |

Figure 6:
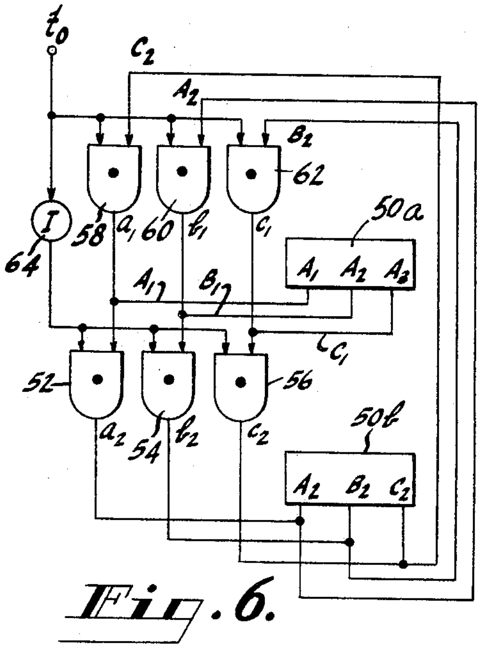
FIGURE 6 is a block circuit diagram of one stage of another form of ternary counter according to the invention.

The ternary counter stage of FIGURE 6 includes two circuits 50*a* and 50*b* corresponding to the circuit 50 within dashed lines in FIGURE 5. The output of circuit 50*a* is applied to AND gates 52, 54 and 56. The output of circuit 50*b* is applied to AND gataes 58, 60 and 62. Note that AND gate 58 receives $C_2$, AND gate 60 receives $A_2$ and AND gate 62 receives $B_2$ whereas AND gates 52, 54 and 56 receive the inputs $A_1$, $B_1$ and $C_1$, respectively. AND gates 58, 60 and 62 supply inputs to circuit 50*a* and AND gates 52, 54 and 56 supply inputs to circuit 50*b*. The trigger pulses $t_0$ are applied directly to gates 58, 60 and 62 and through an inverter 64 to AND gates 52, 54 and 56.

The operation of the circuit of FIGURE 6 is succinctly given in Table IV below.

TABLE IV

| $t_0$ | $A_2B_2C_2$ | $A_1B_1C_1$ |
|---|---|---|
| 1 | 100 | 010 |
| 0 | 010 | 010 |
| 1 | 010 | 001 |
| 0 | 001 | 001 |
| 1 | 001 | 100 |
| 0 | 100 | 100 |
| 1 | 100 | 010 |

As in the previous case, a few lines in the table will be discussed to help the reader better to understand the circuit operation. $A_2B_2C_2$ is assumed initially to be 100. When $t_0$ becomes 1, AND gate 60 becomes enabled and AND gates 58 and 62 remain disabled. Thus, an input $a_1b_1c_1=010$ is applied to circuit 50*a* and its output changes to this same value $A_1B_1C_1=010$.

When $t_0$ changes to 0 AND gate 43 is enabled, AND gates 52 and 56 remain disabled. Thus, circuit 50*b* receives as its input $a_2b_2c_2=010$ and produces as its output the same value 010. AND gates 58, 60 and 62 remain disabled as $t_0=0$ so that $A_1B_1C_1$ retain their stored value 010.

The third complete line of Table IV depicts the circuit operation when $t_0$ changes back to 1. At this time AND gate 62 becomes enabled so that $a_1b_1c_1$ becomes equal to 001 as does $A_1B_1C_1$.

The remainder of the circuit operation may be traced in a manner similar to that given above. Note that the consecutive counts produced by the circuit of FIGURE 6 change cyclically from 100 to 010 to 001 and so on in that order. The connections to the gates may be changed, if desired, to change the order of the count to 100, 001, 010 and so on.

Figure 7:
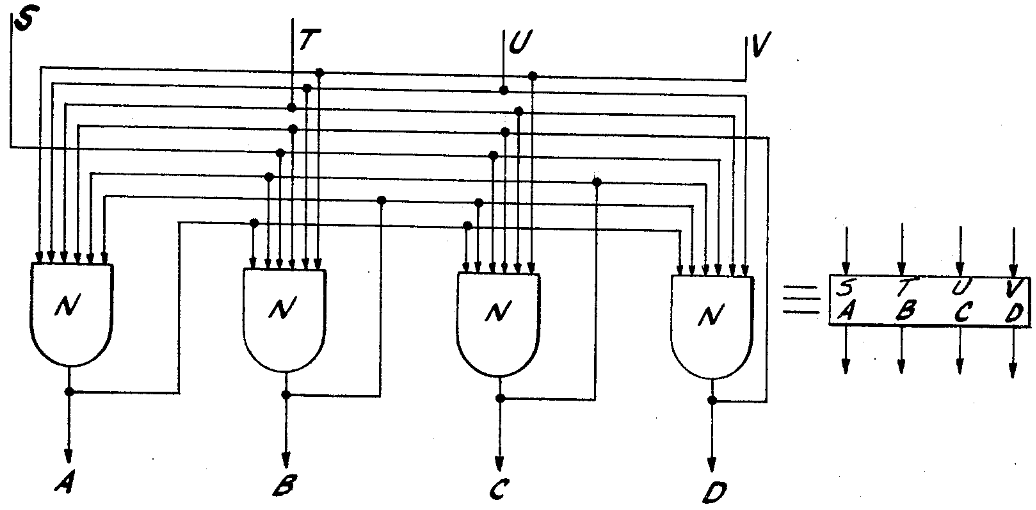
FIGURES 7 and 8 are block diagrams of quartic memory circuits employed in the counters of FIGURES 9 and 10, respectively.
Figure 8:
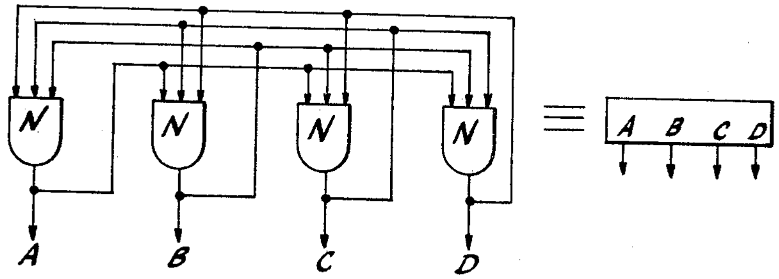

FIGURES 7 and 8 show quartic memory elements analogous to the ternary memory elements of FIGURES 2 and 5, respectively. The one of FIGURE 6 employs four 6-input NOR gates and the one of FIGURE 8 employs four 3-input NOR gates. The operation of both of these circuits is defined in the truth table below.

TABLE V

| STUV / $A_0B_0C_0D_0$ | 0000 | 1000 | 0100 | 0010 | 0001 | |
|---|---|---|---|---|---|---|
| 1000 | 1000 | 1000 | 0100 | 0010 | 0001 | $A_1B_1C_1D_1$ |
| 0100 | 0100 | 1000 | 0100 | 0010 | 0001 | |
| 0010 | 0010 | 1000 | 0100 | 0010 | 0001 | |
| 0001 | 0001 | 1000 | 0100 | 0010 | 0001 | |

Figure 9:
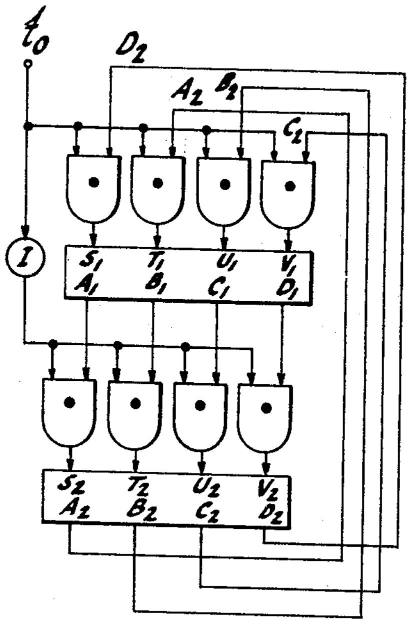
FIGURES 9 and 10 are block circuit diagrams of one stage each of quartic counters according to the invention.
Figure 10:
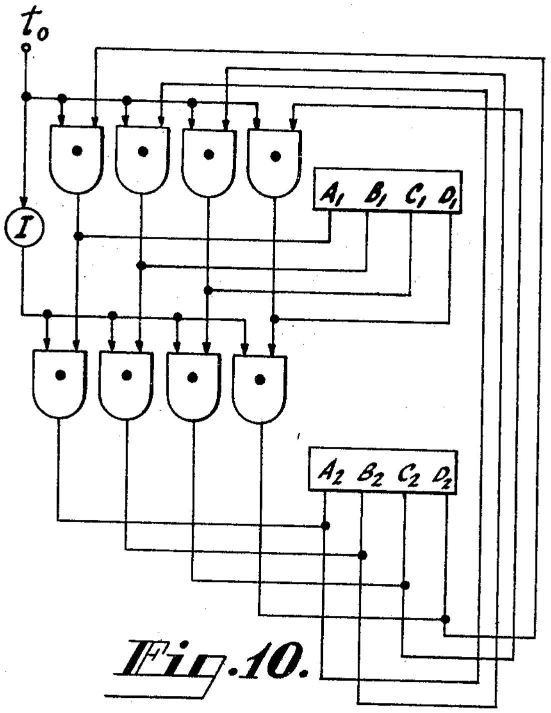

Quartic counters employing the memory elements of FIGURES 7 and 8 are shown in FIGURES 9 and 10, respectively. The operation of these counters should be relatively clear from the description already given of the ternary counters of FIGURES 3 and 6. Both the counters of FIGURES 9 and 10 count in the following sequence: 1000, 0100, 0010, 0001. Again, by changing the order of the feedback connections, the counting sequence can be changed.

The following table is of interest in considering the efficiency of the counter shown and of other counters that can be built utilizing the principles of the invention. For purposes of this discussion, the maximum count which is possible for 48 gates is given in the last column.

TABLE VI

| Base | No. of gates: Per memory element | No. of gates: Complete counter | Max. count for 48 gates |
|---|---|---|---|
| 2 | 2 | 8 | $2^6=64$ |
| 3 | 3 | 12 | $3^4=81$ |
| 4 | 4 | 16 | $4^3=64$ |
| 5 | 5 | 20 | $5^{2.4}=48$ |
| 6 | 6 | 24 | $6^2=36$ |
| n | n | | $\frac{48}{4n}$ |

It is evident from the table above that the ternary counter is the most efficient because it can count the maximum amount with the 48 gates assumed. This finding is in accord with the known fact that the most efficient base for digital computers is $e=2.718$ and hence is nearest to the integer 3.

Another point that is evident from the table is that the base 2 and base 4 counters should be of about the same cost. Nevertheless, the counter to the base 4 is twice as fast as the counter to the base 2 since it employs half the number of counter elements to reach the same maximum count of 64. It is apparent from this that the use of counters having a base greater than 3 will provide an increase in speed but at some sacrifice in optimum efficiency.

While not illustrated, it is clear that the circuits of FIGURES 6, 9 and 10 can be connected to similar stages in the manner shown generally in FIGURE 4 to provide multiple stage ternary and quartic counters. It should also be clear that while only two examples of three-state and two examples of four-state circuits are shown, other counters are possible using other such circuits interconnected in a manner analogous to that shown. For example, the various three-state circuits shown in copending application Ser. No. 567,290, filed July 22, 1966 by the present inventor and J. A. Valleé and assigned to the same assignee as the present application may be employed in ternary counters analogous to the ones shown. It should also be understood that while for purposes of the present application only ternary and quartic counters are illustrated, the same principles are applicable to quintic or, more generally speaking, to any $n$ base counter where $n$ is an integer at least equal to 3.

As mentioned above, an important advantage of the counters of the present invention is their speed. In conventional triggerable flip-flop counters which contain resistor, capacitor steering networks, the operating speed is limited, in one particular case, to about 2–3 megacycles whereas a counter has been constructed in accordance with the present invention using similar circuit elements which operate at a speed of about 10 megacycles.

What is claimed is:

1. An $n$-base counter stage, where $n$ is an integer equal to at least 3, comprising, in combination:

two circuits, each capable of assuming $n$ different states in response to $n$ different binary words, respectively applied to said circuits, and each circuit remaining in a given one of the $n$ states in response to an $(n+1)$'th binary word applied to said circuit;

two gate circuit means, the first receptive of the output word of the second circuit for applying one of said $n$ input words to the first circuit and the second receptive of the output word of the first circuit for applying one of said $n$ input words to the second circuit and each such gate circuit means being capable also of applying said $(n+1)$'th binary word to its circuit; and means, during one time interval, for causing the first gate circuit means to apply to the $(n+1)$'th word to the first circuit and the second gate circuit means to apply one of said $n$ words to said second circuit and, during the succeeding time interval, for causing the second gate circuit means to apply the $(n+1)$'th word to the second circuit and the first gate circuit means to apply one of said $n$ words to said first circuit, and during succeeding time intervals for continuing these operations, each gate circuit means changing the value of the applied word, each second time interval.

2. A counter stage as set forth in claim 1 wherein $n=3$.

3. A counter stage as set forth in claim 1 wherein $n=4$.

4. A counter comprising a plurality of $n$-base counter stages as set forth in claim 1, each counter stage other than the first being connected to the preceding counter stage and each counter stage after the first receiving via its connection to the preceding stage one bit produced by the second circuit of the previous stage for advancing the count stored therein.

References Cited

UNITED STATES PATENTS

| | | | |
|---|---|---|---|
| 3,448,445 | 6/1969 | Vallee | 340—347 |
| 3,099,753 | 7/1963 | Schmookler | 307—88.5 |
| 3,129,340 | 4/1964 | Baskin | 307—88.5 |

MAYNARD R. WILBUR, Primary Examiner

R. F. GNUSE, Assistant Examiner

U.S. Cl. X.R.

235—165; 307—209